United States Patent
Karhuketo et al.

(10) Patent No.: US 9,268,977 B2
(45) Date of Patent: Feb. 23, 2016

(54) ELECTRONIC PRICE LABEL SYSTEM

(75) Inventors: Hannu Karhuketo, Tuusula (FI);
Gregory Wright, Fair Haven, NJ (US)

(73) Assignee: MARISENSE OY, Vantaa (FI)

( * ) Notice: Subject to any disclaimer, the term of this patent is extended or adjusted under 35 U.S.C. 154(b) by 67 days.

(21) Appl. No.: 13/639,689

(22) PCT Filed: Mar. 29, 2011

(86) PCT No.: PCT/FI2011/050261
§ 371 (c)(1),
(2), (4) Date: Oct. 5, 2012

(87) PCT Pub. No.: WO2011/124751
PCT Pub. Date: Oct. 13, 2011

(65) Prior Publication Data
US 2013/0027189 A1    Jan. 31, 2013

(30) Foreign Application Priority Data
Apr. 8, 2010    (FI) .................................. 20105357

(51) Int. Cl.
*G06K 7/00* (2006.01)
*G06K 7/10* (2006.01)
*G06K 19/07* (2006.01)
*G06Q 30/06* (2012.01)

(52) U.S. Cl.
CPC .......... *G06K 7/0008* (2013.01); *G06K 7/10198* (2013.01); *G06K 19/0726* (2013.01); *G06Q 30/06* (2013.01)

(58) Field of Classification Search
CPC .................. H04B 1/70758; H04B 2001/7097; H04B 2201/709763; G06K 19/0726
USPC .................. 340/10.1, 10.3, 10.31, 10.4, 10.5
See application file for complete search history.

(56) References Cited

U.S. PATENT DOCUMENTS

| | | | |
|---|---|---|---|
| 6,172,608 B1 * | 1/2001 | Cole | 340/572.1 |
| 6,317,027 B1 * | 11/2001 | Watkins | 340/10.1 |
| 2004/0036595 A1 * | 2/2004 | Kenny et al. | 340/505 |
| 2005/0104790 A1 * | 5/2005 | Duron | 343/745 |
| 2005/0281320 A1 | 12/2005 | Neugebauer | |
| 2008/0039023 A1 * | 2/2008 | Ward | 455/73 |
| 2008/0088416 A1 | 4/2008 | Crooks et al. | |

FOREIGN PATENT DOCUMENTS

| | | | |
|---|---|---|---|
| EP | 1306794 A2 | 5/2003 | |
| WO | WO 2009/103858 A1 | 8/2009 | |

* cited by examiner

*Primary Examiner* — Andrew Bee
(74) *Attorney, Agent, or Firm* — Birch, Stewart, Kolasch & Birch, LLP

(57) ABSTRACT

A method and system for an electronic price label system comprising at least a base station and a plurality of electronic labels for transferring information between the base station and electronic labels. The method comprises transmitting a first message from base station 6 to a plurality of electronic labels 5a, 5b, the first message comprising at least identification information of one electronic label 5a, 5b, receiving the first message at the electronic label 5a, 5b, recognizing the identification information in the first transmitted message by the electronic label 5a, 5b, transmitting a second message from the base station 6 to the electronic label 5a, 5b, receiving the second message and sending an acknowledgement message to the second message from electronic label 5a, 5b with a modulation frequency from a certain frequency range, and searching the acknowledgement message from a predefined frequency range at the base station 6.

20 Claims, 2 Drawing Sheets

ELECTRONIC PRICE LABEL SYSTEM

FIELD OF THE INVENTION

The invention relates to electronic price label systems. The invention relates especially to updating electronic label information and sending messages.

According to an embodiment of the invention, the arrangement according to the invention can be applied, for example, in various electronic labels for displaying data, equipped with an electronic display. Such displays include, for example, electronic displays for displaying price information on products and other product information in shops and warehouses.

BACKGROUND OF THE INVENTION

Conventionally, the price information on price tags in shops is always changed manually when the price of the product is changed. The new prices are printed out on paper or a corresponding material, and these tags with their new price markings are placed manually in a location reserved for the price tags on shelves in the sales premises. Thus, an employee must first find the correct location of the price tag to be updated, after which the previous price tag is removed and discarded and the new price tag is inserted in its position. A disadvantage in this arrangement is, among other things, the fact that the arrangement is very laborious and there is a high risk of mistakes. In case of a mistake, a situation may, for example, occur, in which the price information on the price tags on the shelves conflicts with the price information in the cash register system.

To avoid the above-mentioned drawbacks, electronic systems have been developed, in which electronic labels and their electronic displays are provided on the front edge or above the shelves, close to the products, in which the price information of the products can be changed in a centralized manner from the control centre of the system, or the like. This will facilitate and accelerate the updating of the price information to a significant extent. The data on the displays can be updated in a cabled or wireless manner, depending on the system. Cabled systems involve the problem that a wire connection must be provided for each display for data transmission and possibly also for power supply. For example in a normal retail outlets for daily consumer goods, the number of displays is relatively large; consequently, there must also be a large number of wires, which causes problems and limitations, for example, on the placement of the price displays.

Wireless systems do not require complex wirings but, in turn, they require transponders equipped with antennas in connection with battery-driven price displays, for communicating with the control unit of the system via suitable communication means. The previously known systems require advanced transmitters and receivers. Advanced transmitters and receivers are costly. This is problematic if the unit cost of e.g. electronic labels would be desired to be low.

SUMMARY OF THE INVENTION

It is an aim of the present invention to reduce the above-mentioned problems and simultaneously to provide a low-cost and reliable arrangement for an electronic price label system.

The idea of the invention is to have an electronic price label system which comprises base stations and electronic labels which have transmitters that can send without exact modulation frequency. This way no crystal resonators are needed to the electronic labels and the costs of the labels can be kept low.

The method according to the invention is presented in claim 1 and the system according to the invention is presented in claim 7. Other embodiments of the invention are characterized in what will be presented in the other claims.

The electronic label can change the reflectance of its own antenna, wherein the electronic label is capable of acknowledging or responding to messages of the base station by simple reply messages. In the following, such a communication method will be described on a general level.

The base station communicates with the electronic labels by transmitting signals which are listened by all the electronic labels and from which a single electronic label identifies a command relating to itself on the basis of a given electronic label specific identification. After receiving a command relating to itself, the single electronic label responds to the base station by reflecting the transmission of the base station itself back to the base station, changed by a phase shift caused by a given time delay and at a given moment of time.

Because the electronic label sends the acknowledgement without an exact modulation frequency, base station will search certain predefined frequency range for being able to find the message sent by the electronic label. Consequently, the base station is capable of identifying the reflected response as belonging to a given price display, because it knows to expect it within a given period of time after sending a unique command to said electronic label.

From its own transmission, the base station can separate the reflected response that is significantly weaker in power, e.g. on the basis of the phase shift produced by the electronic label.

In one embodiment of the invention the base station can send correction commands to the electronic label so that the frequency electronic label uses, could be adjusted nearer to the desired modulation frequency.

DESCRIPTION OF THE DRAWINGS

In the following, the invention will be described in more detail by means of an embodiment example with reference to the appended drawings, in which.

DETAILED DESCRIPTION OF THE INVENTION

Figure 1:
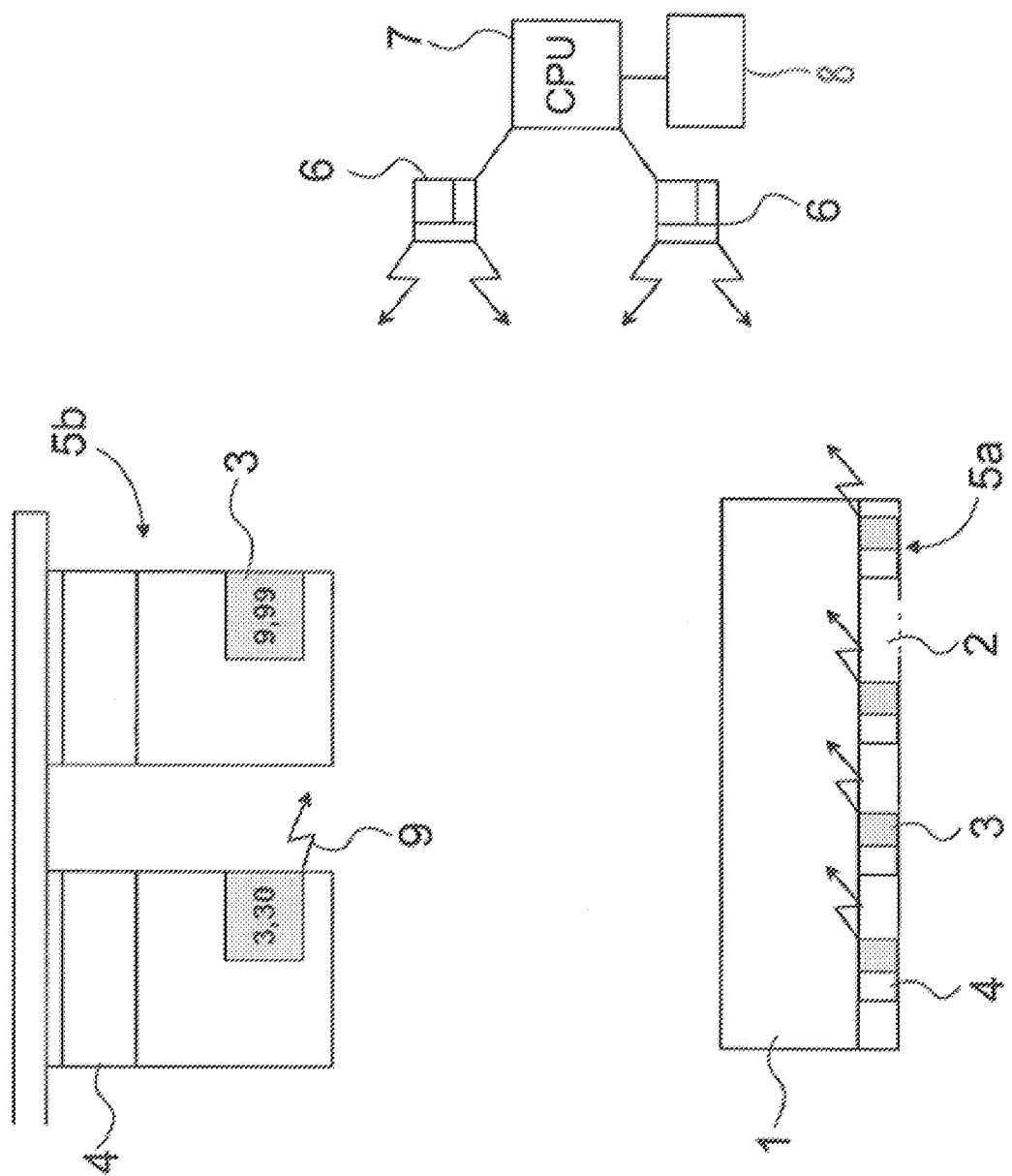
FIG. 1 shows a schematic and simplified view of an arrangement of the invention in a supermarket or in corresponding sales premises, applied in connection with electronic labels.

FIG. 1 shows a schematic and simplified view of an arrangement according to the invention in a supermarket or in corresponding sales premises. Product shelves 1 are equipped with shelf rails 2, on which electronic labels 5a equipped with, for example, electrophoretic laminate displays 3 and product information 4 are placed in locations corresponding to products.

The laminate display 3 is arranged to display the price of the product, and the product information 4 contains, among other things, the name of the product and possibly some other information relating to the product. In a corresponding manner, there are, in required locations in the sales premises, hanging electronic labels 5b forming a display pocket, which also comprise both an electrophoretic laminate display 3 and product information 4.

Each electronic laminate display 3, or shortly display 3, constitutes a thin price tag equipped with display segments and resembling a paper price tag, in which the required product prices and other necessary symbols are formed by changing the color of the substantially two-colored display segments.

One layer of the display is, for example, an active ink layer. The ink layer contains a number of microcapsules filled with liquid and containing, for example, substantially black particles with a positive surface charge and substantially white particles with a negative surface charge, whose location in the microcapsules is controlled by an electric field so that at the desired display segments, the black particles are on top, wherein said display segments look black when viewed from above, and at the other display segments, the white particles are on top, wherein these display segments look white when viewed from above. The background of the display consists of the same microcapsules, wherein, for example, the price information can be displayed as dark numbers against a light background, or vice versa, if desired. Such a display used can be, for example, the electrophoretic microcapsule display laminate disclosed in Finnish patent application No. FI 20050192.

Furthermore, the system comprises at least a central processing unit 7 connected to a base station 6 or other communication means, via which it is possible to transmit, for example, updated price information and other control information to the display 3. Furthermore, the system may comprise scanners 8 located at cash registers and connected to the cash register system, for scanning the price, wherein the cash register system and the electronic labels always have the same up-to-date information on the prices of the products. Furthermore, the central processing unit 7 may be coupled to other controlling and supporting systems. The wireless connection between the central processing unit 7 and the electronic labels 5a, 5b is illustrated with arrows 9.

The electronic labels 5a, 5b can have multiple memory locations for the information, for example for price information. The electronic labels 5a, 5b can also comprise multiple different views stored in the memory locations i.e. different pages that include different information to be displayed.

The application of the invention is not limited solely to price displays that employ display technology of the above-described kind, but it is obvious that the price displays can, as such, be implemented by applying any known technology.

Figure 2:
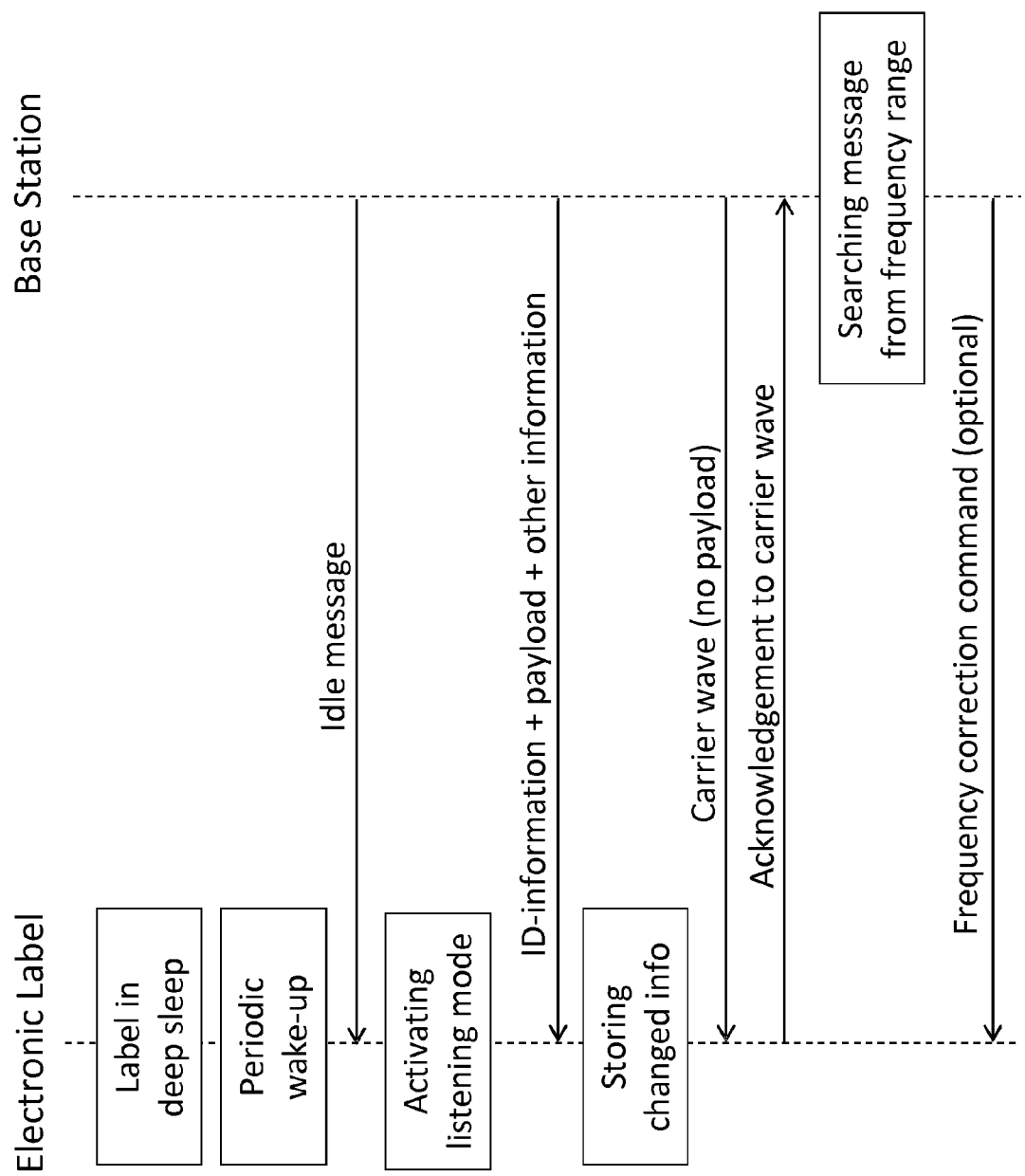
FIG. 2 shows an example message sequence chart for communication between electronic label and the base station.

FIG. 2 presents an example message sequence chart of communication between a base station 6 and an electronic label 5a, 5b. The electronic labels 5a, 5b are in deep sleep mode during most of the time. In the deep sleep mode the battery consumption is much lower than in the active operation. The electronic labels 5a, 5b wake up from deep periodically to listen if there is broadcast of the base station 6. The base station 6 sends idle messages to wake up the electronic labels 5a, 5b. When the electronic label 5a, 5b receives the idle-message it activates the listening mode. The idle messages can be for example broadcast messages that contain no payload and no specific identification information of any electronic label 5a, 5b.

When the electronic labels 5a, 5b are in listening mode the base station 6 sends a first message containing identification information of the electronic label 5a, 5b the base station 6 wants to send a message to. The message may contain payload or other information, e.g. new price information to be displayed in the display of the electronic label 5a, 5b. The electronic label 5a, 5b that is wanted to be contacted receives the message and recognizes its own identification information. After receiving the message comprising e.g. new price information to be displayed the electronic label 5a, 5b stores the information.

To make sure that the electronic label 5a, 5b received the first message an acknowledgement message is needed from the electronic label. Therefore after transmitting a message intended for a given price display, the base station 6 starts to transmit a second message, for example, a carrier wave of a given type for a given period of time, the carrier wave being reflected back as an acknowledgement, with a given phase shift, by the electronic label 5a, 5b that recognized the command. In one embodiment of the invention the second message contains only carrier wave.

The electronic label 5a, 5b can answer the message for example as described below. The electronic label 5a, 5b reflects back the carrier wave transmitted by the base station 6, which may have a frequency of, for example, 685 MHz so that the electronic label 5a, 5b grounds the antenna of the receiver 11 by means of the mode changing means 17 at the frequency of, for example, 150 kHz, thereby producing a kind of square wave from the reflected signal. The electronic label 5a, 5b thus affects the reflected signal by changing the mode of the antenna. In this reflection, the phase shift of the signal would be preferably 180 degrees, at which the detection of a low-powered reflection by the base station 6 is at its best. Sending the acknowledgement can also take place simultaneously to the sending of the second message.

Because the transmitter of the electronic label 5a, 5b doesn't have an exact oscillator, e.g. a crystal oscillator, for exact modulation frequency, the transmission of the acknowledgement happens at a frequency range around the intended modulation frequency. To be able to receive the acknowledgement message properly the base station 6 has to search the transmission from a certain frequency range around the intended and specified modulation frequency.

The search can be done by using for example FFT (fast Fourier transform) or by dividing the frequency range to sub channels and searching the sub channels. By these methods or other similar search methods the base station 6 is able to receive the acknowledgement properly although it's not sent necessarily exactly on the intended and specified modulation frequency.

In one embodiment of the invention after receiving the acknowledgement message from the electronic label 5a, 5b, the base station 6 can send a modulation frequency correction command to the electronic label 5a, 5b. The modulation correction command can include a command to use a higher or lower modulation frequency and to how much to raise or lower the frequency.

In one embodiment of the invention the broadcast messages can also contain payload data but no specific identification information of any electronic label 5a, 5b. The electronic labels 5a, 5b can store the information in the broadcast message payload data to their storage locations. With broadcast messages it's possible to send a command for all electronic labels 5a, 5b to e.g. store information to certain memory location or to view content of certain memory location.

The invention relates to a method for an electronic price label system comprising at least a base station and a plurality of electronic labels for transferring information between the base station and electronic labels. The method comprises transmitting a first message from base station 6 to a plurality of electronic labels 5a, 5b, the first message comprising at least identification information of one electronic label 5a, 5b, receiving the first message at the electronic label 5a, 5b, recognizing the identification information in the first transmitted message by the electronic label 5a, 5b, transmitting a second message from the base station 6 to the electronic label 5a, 5b, receiving the second message and sending an acknowledgement message to the second message from electronic label 5a, 5b with a modulation frequency from a certain frequency range, and searching the acknowledgement message from a predefined frequency range at the base station 6.

In one embodiment of the invention the base station 6 sends a frequency correction command to the electronic label 5a, 5b based on frequency used by the electronic label 5a, 5b while sending the acknowledgement message.

In one embodiment of the invention the base station 6 searches the acknowledgement message by using fast Fourier transform.

In one embodiment of the invention the base station 6 searches the acknowledgement message by dividing the frequency range to sub bands and searches the sub bands.

In one embodiment of the invention the listening mode is activated in an electronic label 5a, 5b before receiving the first message.

In one embodiment of the invention the acknowledgement is sent with a transmitter which is not controlled by a crystal oscillator.

The invention relates also to an electronic price label system, comprising at least one base station and a plurality of electronic labels 1, 2 wherein information is transferred between the base station and electronic labels. The base station 6 is configured to transmit a first message to the plurality of electronic labels 5a, 5b comprising at least identification information of one electronic label 5a, 5b. Electronic labels 5a, 5b are configured to receive the first message and further configured to recognize the identification information in the message. The base station 6 is further configured to transmit a second message. The electronic labels 5a, 5b are further configured to receive the second message and to send an acknowledgement to the second message with a transmitter which transmits with modulation frequency from a certain frequency range. The base station 6 is further configured to search the acknowledgement from the frequency range.

In one embodiment of the invention the base station 6 is configured to send a frequency correction command to the electronic label 5a, 5b based on frequency used by the electronic label 5a, 5b while sending the acknowledgement message.

In one embodiment of the invention the base station 6 is configured to search the acknowledgement message by using fast Fourier transform.

In one embodiment of the invention the base station 6 is configured to search the acknowledgement message by dividing the frequency range to sub bands and by searching the sub bands.

In one embodiment of the invention an electronic label 5a, 5b is configured to activate the listening mode before receiving the first message.

In one embodiment of the invention the transmitters of the electronic labels are not controlled by a crystal oscillator.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

The invention claimed is:

1. A method for transmitting information in an electronic price label system which includes at least a base station and a plurality of electronic labels for transferring information between the base station and electronic labels, said method comprising:

transmitting a first message from a base station to a plurality of electronic labels, the first message containing at least identification information of one electronic label, receiving the first message at the electronic label, recognizing the identification information in the first transmitted message by the electronic label, transmitting a second message from the base station to the electronic label, receiving the second message and sending an acknowledgement message to the second message from the electronic label with an unspecified modulation frequency in a certain frequency range, wherein the base station is adapted to search a predefined frequency range to find acknowledgement messages sent by the electronic label and to identify a response from a given display of the electronic label based upon a given time period after transmitting the second message to the electronic label.

2. The method according to claim 1 wherein the base station sends a frequency correction command to the electronic label based on the unspecified modulation frequency used by the electronic label while sending the acknowledgement message.

3. The method according to claim 2 wherein the base station searches the acknowledgement message by using fast Fourier transform.

4. The method according to claim 2 wherein the base station searches the acknowledgement message by dividing the frequency range into sub-bands and searches the sub-bands.

5. The method according to claim 2 further comprising activating a listening mode in the electronic label before receiving the first message.

6. The method according to claim 2, wherein the acknowledgement is sent with a transmitter in which the used modulation frequency is not controlled by a crystal oscillator.

7. The method according to claim 1 wherein the base station searches the acknowledgement message by using fast Fourier transform.

8. The method according to claim 7 further comprising activating a listening mode in the electronic label before receiving the first message.

9. The method according to claim 7, wherein the acknowledgement is sent with a transmitter in which the used modulation frequency is not controlled by a crystal oscillator.

10. The method according to claim 1 wherein the base station searches the acknowledgement message by dividing the frequency range into sub-bands and searches the sub bands.

11. The method according to claim 10 further comprising activating a listening mode in the electronic label before receiving the first message.

12. The method according to claim 10, wherein the acknowledgement is sent with a transmitter in which the used modulation frequency is not controlled by a crystal oscillator.

13. The method according to claim 1 further comprising activating a listening mode in the electronic label before receiving the first message.

14. The method according to claim 1, wherein the acknowledgement is sent with a transmitter in which the used modulation frequency is not controlled by a crystal oscillator.

15. An electronic price label system, including at least one base station and a plurality of electronic labels, wherein information is transferred between the base station and electronic labels, which comprises a base station configured to transmit a first message to the plurality of electronic labels including at least identification information of one electronic label, said electronic label being configured to receive the first message, and to recognize the identification information in the message, the base station is further configured to transmit a second message, the electronic label being further configured to receive the second message and to send an acknowledgement to the second message with a transmitter which transmits with an unspecified modulation frequency from a certain frequency range, and the base station is further configured to search a predefined frequency range to find acknowledgement messages sent by the electronic label with the unspecified modulation frequency from the frequency range and to identify a response from a given display of the electronic label based upon a given time period after transmitting the second message to the electronic label.

16. The system according to claim 15 wherein the base station is configured to send a frequency correction command to the electronic label based on frequency used by the electronic label while sending the acknowledgement message.

17. The system according to claim 15 wherein the base station is configured to search the acknowledgement message by using fast Fourier transform.

18. The system according to claim 15 wherein the base station is configured to search the acknowledgement message by dividing the frequency range into sub-bands and by searching the sub-bands.

19. The system according to claim 15 wherein the electronic label is configured to activate a listening mode before receiving the first message.

20. The system according to claim 15 wherein the transmitters of the electronic labels are not controlled by a crystal oscillator.

* * * * *